United States Patent
Seroussi et al.

(10) Patent No.: US 7,136,533 B2
(45) Date of Patent: Nov. 14, 2006

(54) COLOR IMAGE COMPRESSION WITH ADAPTIVE PREDICTION

(75) Inventors: Gadiel Seroussi, Cupertino, CA (US); Marcelo Weinberger, San Jose, CA (US); Adriana Piazza, Montevideo (UY)

(73) Assignee: Hewlett-Packard Development Company, L.P., Houston, TX (US)

( * ) Notice: Subject to any disclaimer, the term of this patent is extended or adjusted under 35 U.S.C. 154(b) by 330 days.

(21) Appl. No.: 10/324,582

(22) Filed: Dec. 19, 2002

(65) Prior Publication Data

US 2004/0120588 A1 Jun. 24, 2004

(51) Int. Cl.
    *G06K 9/36* (2006.01)
(52) U.S. Cl. .................. 382/238; 358/525; 382/166; 382/253; 382/300
(58) Field of Classification Search .............. 358/1.9, 358/1.18, 426.13, 539, 525; 375/240.08, 375/240.12, 240.16, 240.24, 240.22; 382/166, 382/191, 232–233, 236–239, 243–246, 253, 382/300; 348/394.1
    See application file for complete search history.

(56) References Cited

U.S. PATENT DOCUMENTS

| | | | | |
|---|---|---|---|---|
| 5,408,542 A | * | 4/1995 | Callahan | 382/244 |
| 5,687,303 A | * | 11/1997 | Motamed et al. | 358/1.18 |
| 5,796,864 A | * | 8/1998 | Callahan | 382/166 |
| 5,856,848 A | * | 1/1999 | Fujiwara et al. | 375/240.13 |
| 5,923,783 A | * | 7/1999 | Kawauchi et al. | 382/233 |
| 6,212,234 B1 | * | 4/2001 | Andoh et al. | 375/240.08 |
| 6,292,587 B1 | * | 9/2001 | Toho | 382/238 |
| 6,549,676 B1 | * | 4/2003 | Nakayama et al. | 382/246 |
| 6,636,642 B1 | * | 10/2003 | Yokose | 382/238 |
| 6,694,061 B1 | * | 2/2004 | Acharya | 382/251 |
| 6,711,295 B1 | * | 3/2004 | Nakayama et al. | 382/232 |
| 2002/0176631 A1 | | 11/2002 | Li | |
| 2004/0120588 A1 | * | 6/2004 | Seroussi et al. | 382/238 |

OTHER PUBLICATIONS

Marcelo J Weinberger et al—"The LOCO-I Lossless Image Compression Algprithm: Principles and Standardization into JPEG-LS" —IEEE Transactions on Image Processing vol. 9 No. 8 Aug. 2000—pp. 1309-1324.

M J Weinberger et al —"From LOCO-I to the JPEG-LS Standard" —International Conference on Image Processing Proceedings—Oct. 1999—pp. 68-72.

* cited by examiner

*Primary Examiner*—Gregory Desire

(57) ABSTRACT

Compression and reconstruction of a digital image are both performed by accessing a plurality of color caches corresponding to different chromatic contexts, selecting a color cache for a pixel value being processed, and using information in the selected color cache to predict a value for the pixel being processed.

40 Claims, 4 Drawing Sheets

COLOR IMAGE COMPRESSION WITH ADAPTIVE PREDICTION

BACKGROUND

Data compression is used for reducing the cost of storing large image files. It is also used for reducing the time of transmitting large image files.

Certain techniques are good for compressing certain types of images, but not others. A compression technique such as palettization provides good bit rates for lossless compression of images having only a small number of colors. However, palettization is not practical for images having large numbers of colors. In some instances, palettization can increase file size due to the cost of palette description. In contrast, a lossless compression technique such as JPEG-LS provides good bit rates for photos and other natural images. However, the potential of JPEG-LS is not fully exploited if portions of an image contain only a few dissimilar colors, as in the case of compound documents (which contain both text and natural images).

According to one aspect of the present invention, a plurality of color caches corresponding to different chromatic contexts are accessed, a color cache for a pixel value being processed is selected, and information in the selected color cache is used to predict a value for the pixel being processed.

According to a second aspect of the present invention, an error is determined between a predicted value and an actual value of a pixel being processed, the error is encoded if the error satisfies a constraint, and default is made to a backup technique to code the pixel being processed if the error does not satisfy the constraint.

According to a third aspect of the present invention, a cache is generated of pixel values already processed, the cache is used to predict a value of a pixel being processed, and a pixel value is added to the cache if the actual value of the pixel being processed is not found in the cache.

Other aspects and advantages of the present invention will become apparent from the following detailed description, taken in conjunction with the accompanying drawings, illustrating by way of example the principles of the invention.

DETAILED DESCRIPTION

As shown in the drawings for purposes of illustration, the present invention is embodied in a system including an encoder for performing lossless compression of digital images and a decoder for reconstructing the digital images. During compression, a color image is traversed, and pixels values are coded. Pixel values in a causal neighborhood are used to determine the chromatic context of the pixel being coded. Color caches are generated and updated for the different chromatic contexts. Each color cache contains pixel values that have already been processed in that chromatic context. Similar pixel values are assumed likely to occur again in the same chromatic context. The color caches are used to predict values of the pixels being coded. Only the error between the predicted and actual pixel values is encoded and written to a bitstream.

The system works with full color vectors. Multiple color components are processed simultaneously instead of separately.

The system adapts to different types of images and regions within. This makes the system effective on documents containing many colors, documents containing only a few colors, and compound document.

Figure 1:
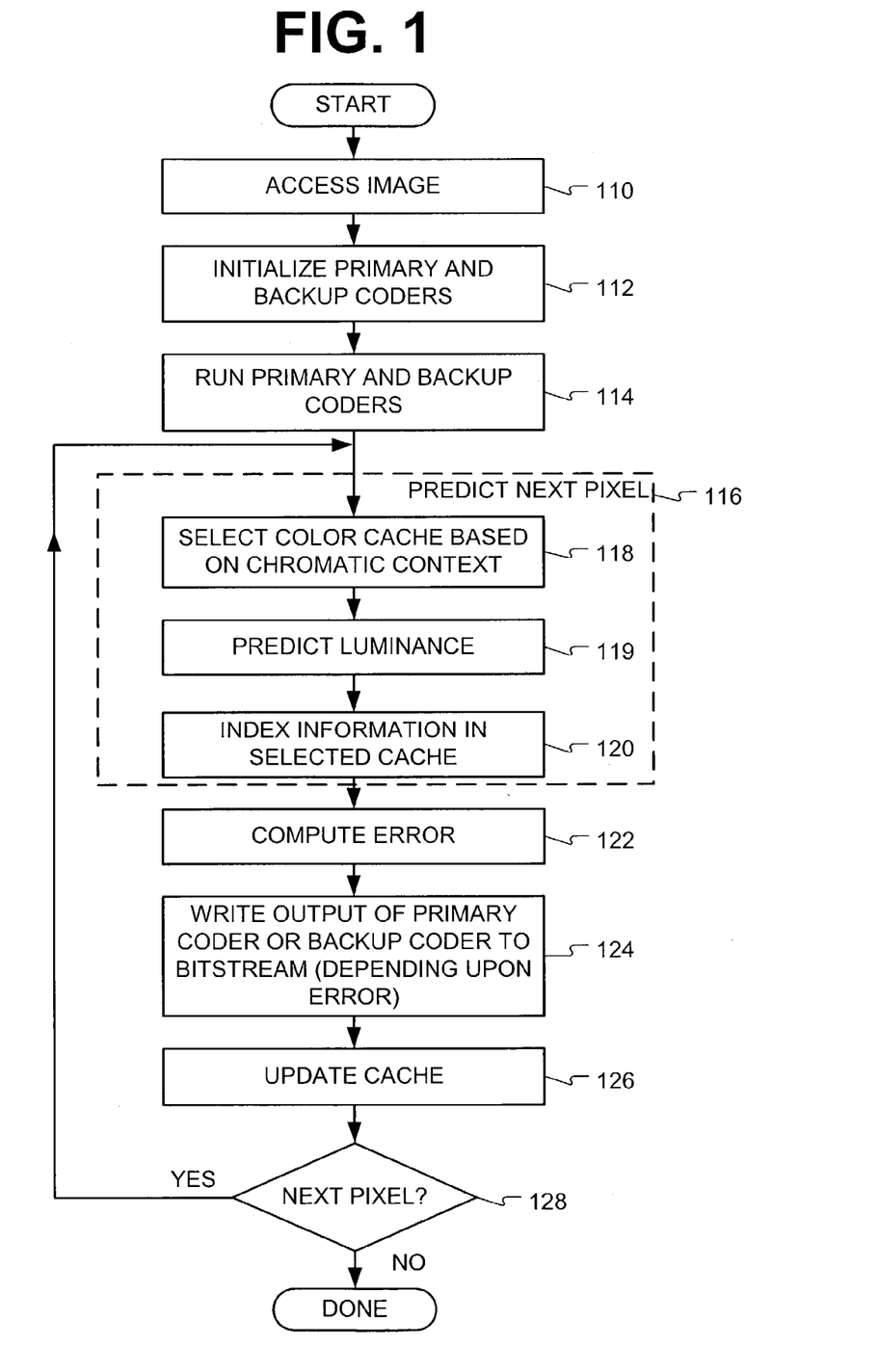
FIG. 1 is an illustration of a method of compressing an image in accordance with an embodiment of the present invention.

Reference is made to FIG. 1, which shows an exemplary method of compressing a digital color image. Compression is started by accessing the image (110). The image is represented in a color space such as RGB. In a typical 24-bit word representing RGB color space, eight bits represent a red component, eight bits represent a green component, and eight bits represent a blue component.

Initialization is performed (112). As part of the initialization, a primary coder is initialized. The primary coder uses color caches. Thus initialization is performed by defining color caches for different chromatic contexts. The color caches may be filled with initial pixel values, or they may be left empty.

Also as part of the initialization, a backup coder is initialized. The backup coder may use a conventional lossless technique such as JPEG-LS The primary and backup coders are run (114). The coding of the pixels in the image is performed in a given order. For example, the order could follow a raster scan.

The primary coder predicts values of the pixel being processed from pixel values (e.g., from a causal neighborhood of pixels) that have been previously processed (116). The previously processed pixel values are used to select a chromatic context and, therefore, a color cache (118). The luminance of the predicted pixel value is predicted (119) and used to index a pixel value in the selected color cache (120). The indexed pixel value may be used as a prediction for the pixel value being coded. Thus the predictions may be the pixel values that have already occurred. In the alternative, the predictions may be synthesized from values that have already occurred.

An error between the predicted pixel value and the actual pixel value is computed (122). This error may be a difference between predicted and actual values, or a difference of their indices. If the error is within acceptable bounds, the error is coded and written to the bitstream (124). Any coding technique (e.g., arithmetic coding) may be used. A coding technique that reduces word length will be described below in connection with FIG. 3.

If the error is not within acceptable bounds (e.g., the error is too large, an index-based error cannot be computed because the actual pixel value is not in a cache), then the backup coder is used to code the value of the pixel being processed (124). An output of the backup coder is written to the bitstream.

The selected color cache is updated (126). It is assumed that the value of the pixel being processed is likely to occur again in the same chromatic context. Therefore, the value of the pixel being processed is added to the selected color cache.

Processing continues until the entire image has been compressed (128). For each additional pixel that is processed, either the output of the primary coder or the output of the backup coder is written to the bitstream. Further, each additional pixel value is added to a selected color cache. Thus each color cache is filled with pixel values that have already occurred.

The selected color cache may be further updated by removing pixel values that are unlikely to occur again. The unlikely pixel values may be removed to prevent the color caches from becoming too large. A pixel value may be removed each time the color cache is selected, as shown in FIG. 1. As another example, pixel values could be removed after every M lines of the image have been processed. An example of updating the color caches will be provided below in connection with FIG. 2.

At the beginning of compression, the backup coder is more likely to be used, since the initial color caches will be empty or filled with meaningless values. Once the color caches are filled with actual pixel values, the predictions will become more accurate, and the errors will become smaller. Eventually, the primary coder will be used frequently, and the backup coder will be used only when needed.

Even if the output of the backup coder is not written to the bitstream, the backup coder is still active. The backup coder maintains statistics that allow it to perform coding when needed.

Full color vectors are cached and indexed. This allows multiple color components to be processed simultaneously instead of separately.

Figure 2:
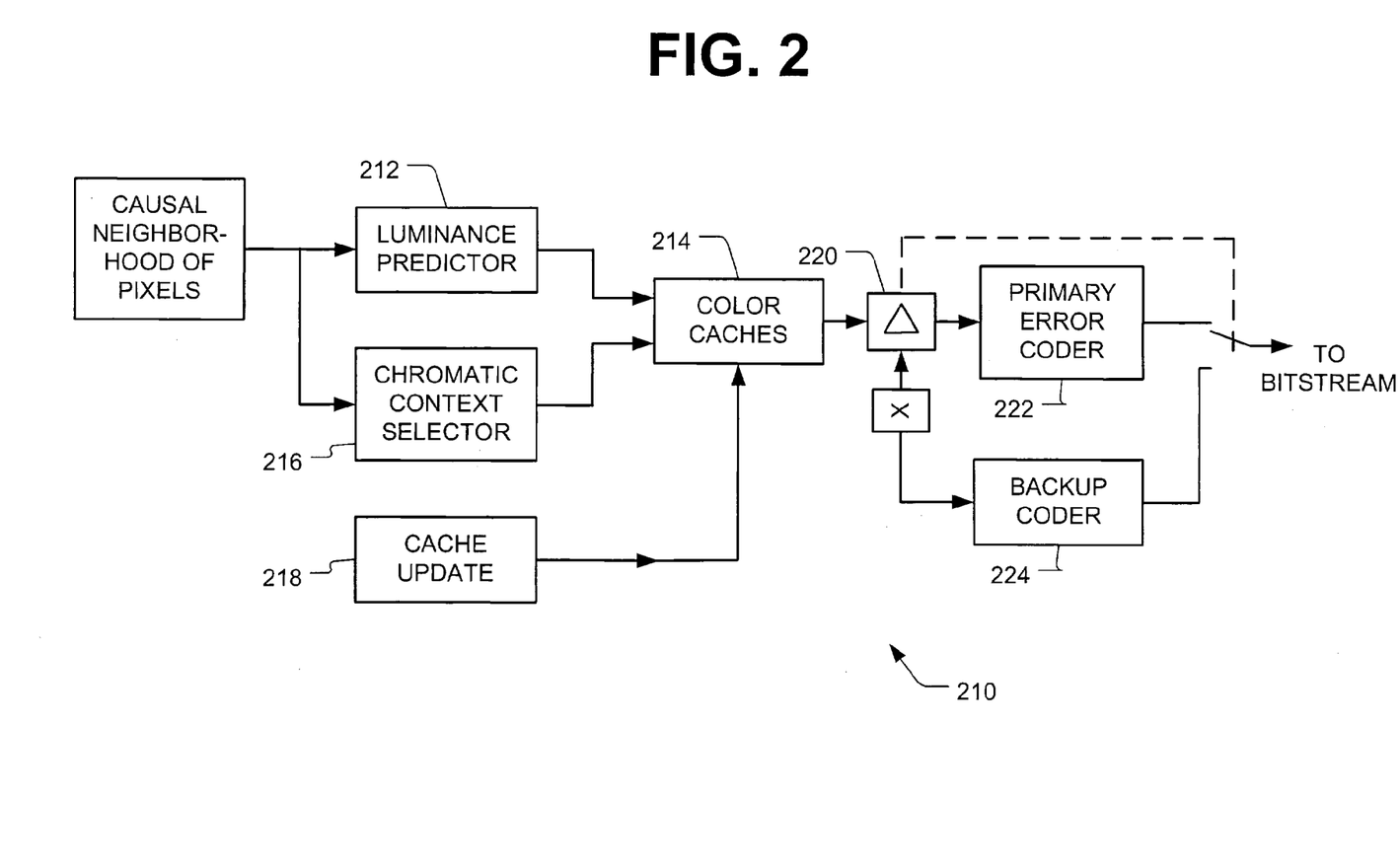
FIG. 2 is an illustration of an encoder for compressing an image in accordance with an embodiment of the present invention.

Reference is now made to FIG. 2, which shows an exemplary encoder 210. The encoder will be described in connection with an exemplary block of pixels. The exemplary block includes the pixel being coded (the current pixel), which is denoted by the letter "X". This exemplary block also includes pixels that have already been processed: the Northwest ("NW") pixel, the North ("N") pixel, the Northeast ("NE") pixel and the West ("W") pixel. If, during the scan, the East pixel is processed before the current pixel, the East pixel is used instead of the West pixel. In certain instances, the East or West pixel will not be available (e.g., the current pixel is the first pixel of a row to be processed).

The encoder 210 includes a luminance predictor 212 for predicting the luminance of the current pixel (X). For example, the luminance ($\hat{L}_x$) of the current pixel (X) may be predicted by the following MED predictor:

$$\hat{L}_x = \begin{cases} \min(L_W, L_N) & \text{if } L_{NW} \geq \max(L_W, L_N) \\ \max(L_W, L_N) & \text{if } L_{NW} \leq \min(L_W, L_N) \\ L_W + L_N - L_{NM} & \text{otherwise} \end{cases}$$

where $L_{NW}$, $L_N$, $L_{NE}$ and $L_W$ represent the luminances of the NW, N, NE and W pixels. Since the RGB description of the pixels is available, the MED predictor may instead be applied to each of the three components and then the corresponding luminance value is computed. Thus an intensity would be estimated for each color component. Then bias cancellation may be applied. The bias cancellation may be the same as performed in JPEG-LS.

The encoder 210 includes memory 214 for maintaining the color caches, and a chromatic context selector 216 for selecting a color cache for the current pixel. The selector 216 may convert the RGB values of neighboring pixels to YUV values, and use the UV values to determine the chromatic context to select the color cache for the current pixel. The chromatic contexts may be defined by dividing the UV plane into color regions and mapping each pixel value in the causal neighborhood to a region. The partition into regions need not be the same for all allocations in the causal neighborhood. A larger number of regions may be used in order to give more weight to a specific neighboring pixel in the decision to assign a chromatic context to the current pixel.

The pixel values stored in each color cache may be sorted in order of luminance value to speed up access from the selected color cache. The pixel value with the luminance value that is closest to the predicted one is chosen as the predicted color. Four different realizations of defining and selecting color caches will now be described.

In the first realization, the UV-plane is divided into n disjoint regions (e.g., four quads, eight octants). Each region defines a chromatic context. The classification of the W, NW, N and NE pixels into these n regions will define $n^4$ chromatic contexts that are available for selection. The four-dimensional vector is mapped, on a one-to-one basis, into an index in the range $[0, n^4-1]$. This index identifies the color cache associated to the chromatic contexts. In a more general procedure, the number and the shape of the regions into which the UV-plane is divided could be different for each of the W, NW, N and NE pixels.

In the second realization, the chromatic contexts are defined as in the first realization, except that there is no fixed correspondence between the color cache and the chromatic contexts. Rather, the color caches are associated with disjoint regions of the UV plane, and their number could differ from the number of chromatic contexts. The color cache with the largest estimated likelihood is selected. The likelihood may be estimated as a ratio of the number of times a color from the UV region associated with this cache has been processed in the current chromatic context divided by the number of occurrences of this chromatic context. The context selector 216 keeps tracks of the statistics for determining the number of occurrences of the UV regions associated with color caches.

In the third realization the UV-plane is divided into as many regions as required color caches. One color cache is assigned to one and only one region. The W, NW, N, and NE pixels are checked to identify the color cache to which they belong, and, the color cache that obtains the majority is selected for the current pixel. In case of a tie, the color cache of the closest pixel (e.g., the West or North pixel) is selected.

In the fourth realization the regions corresponding to the W and NW pixels are compared. If these regions are identical, the chromatic context of the N pixel is assigned to the current pixel. Otherwise; the chromatic context of the W pixel is assigned to the current pixel. This fourth realization is motivated by the MED predictor in an attempt to detect the edges in the image. If the W and NW pixels belong to the same region, a vertical edge is assumed to lie just left to the current pixel. Thus, the current pixel is likely to have the same chromatic context as the N pixel. Analogously, if the N and NW pixels have the same context, a horizontal edge is assumed to lie just above of the current pixel, whereby the current pixel is assumed to have the same chromatic context as the W pixel. If neither of these conditions is met, smoothness of the causal neighborhood is assumed, whereby the chromatic context of the closest pixel is assigned.

The encoder 210 includes a block 218 for updating the color caches. The pixel values least likely to occur again may be deleted from the color caches after each M image lines have been processed. The number of pixel values to be deleted may depend on the size of the color cache. A fixed upper bound may be used to prevent the size of the color caches from growing too large. This way, small color caches are allowed to grow. A criterion for identifying the pixel values to be deleted may be based on how recently a pixel value was used. A timestamp may be used to determine recency relative to a selected chromatic context.

The encoder 210 includes a block 220 for determining the error vector between the predicted pixel value $X_P$ and the actual value of the current pixel, a primary error encoder 222 for coding the error vector, and a JPEG-LS coder 224 as a backup. An arithmetic code may be used to code the error. One example of a coding strategy is to define a three-dimensional vector alphabet where each color component can take one of six values {0, ±1, ±2, escape}, which leads to a 216 ($6^3$) letters alphabet for 3-D color space. The error vector may be arithmetically encoded using this alphabet, and the encoded value is added to the bitstream. A coding context for coding the error would be different than the chromatic context.

If the absolute error of any of the components is greater than a bound (e.g., 2), the error code is assigned escape, and the component(s) corresponding to the escape are coded by the JPEG-LS coder 224 and added to the bitstream instead. To this end, the JPEG-LS coder 224 should track the statistics necessary for JPEG-LS coding. The JPEG-LS coder 224 could run in parallel with the primary error encoder 222, and coded pixel values from the JPEG-LS coder 224 would be added to the bitstream only when needed. Increasing the alphabet size of the error vector would reduce the likelihood of using the JPEG-LS coder 224, but it would increase the bit rate of the arithmetic coding.

The encoder 210 is not limited to coding of the error vector between predicted and actual pixel values. Instead, the block 220 determines the error between a predicted index (based on the luminance predictor) and the index of the actual pixel value in the selected color cache. The primary error encoder 222 codes the error between predicted and actual indices. If the actual pixel value is not found in the selected color cache, the index error is not written to the bitstream, and the backup coder is used instead.

These two coding strategies can be combined. For example, if all error components are assigned an escape, the indices may be coded and written to the bitstream.

Figure 3:
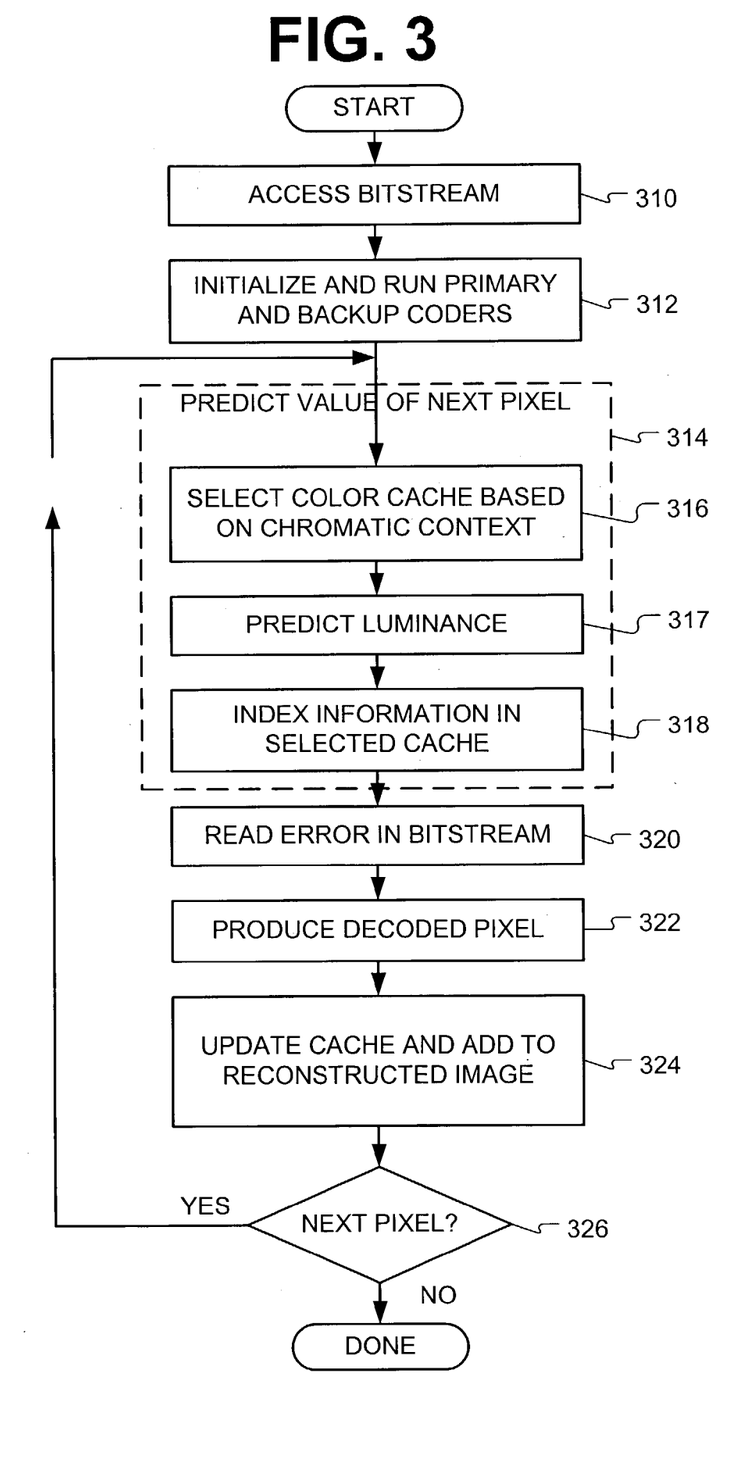
FIG. 3 is an illustration of a method of reconstructing an image in accordance with an embodiment of the present invention.

Reference is now made to FIG. 3, which shows a method of reconstructing the image from the bitstream. Reconstruction is initiated by accessing the bitstream (310). Primary and backup decoders are initialized and run (312). The primary decoder predicts the value of the next pixel (314) just as the encoder does by selecting a color cache based on chromatic context (316), predicting a luminance value (317), and using the predicted luminance value to index information in the selected cache (318). The error in the bitstream is read and decoded (320). Either the backup coder produces a decoded pixel value, or the decoded pixel value is produced by adding the decoded error to the predicted pixel value (322). The decoded pixel value is added to the selected color cache and added to the reconstructed image (324), and the next pixel is reconstructed (326).

Figure 4:
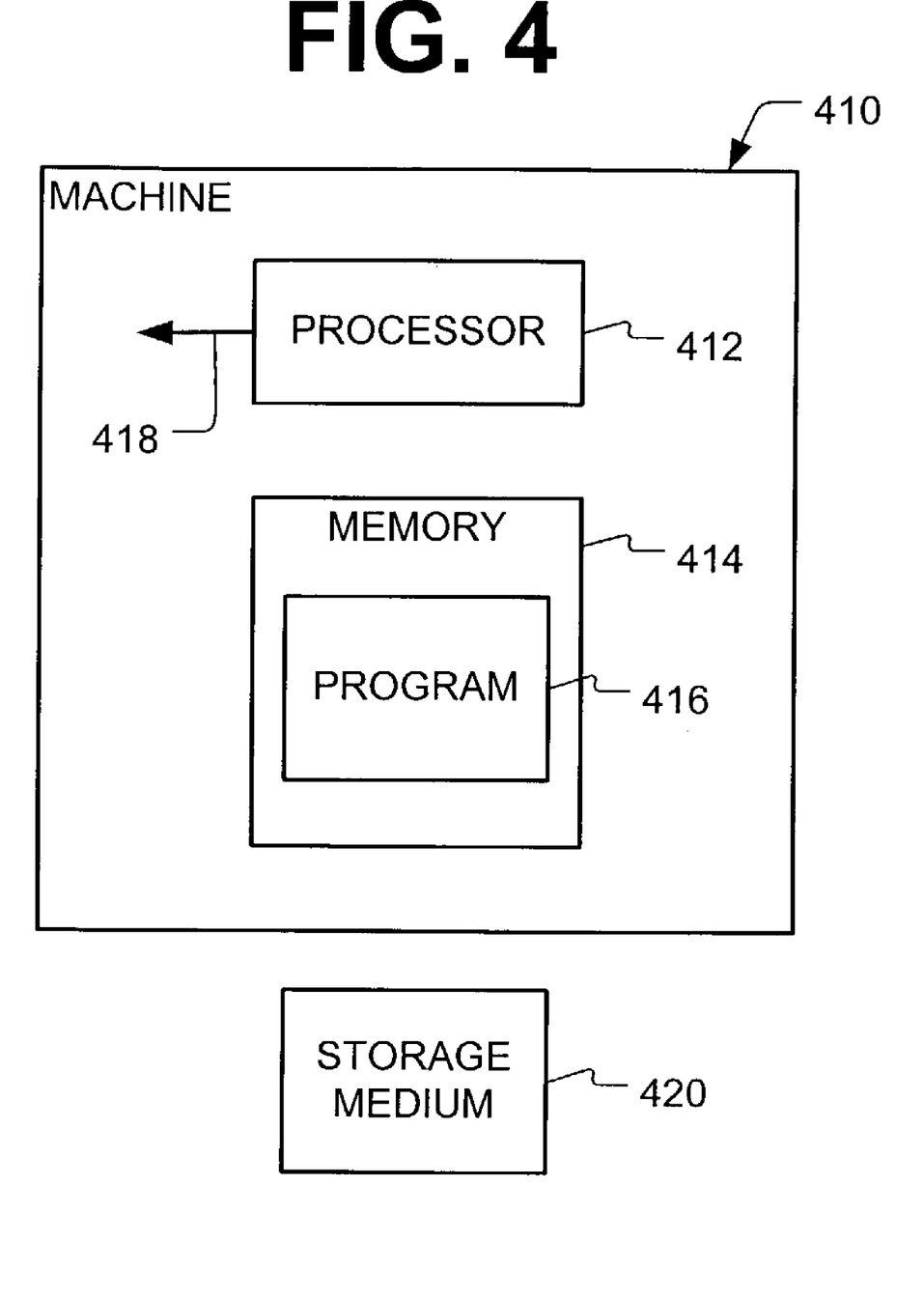
FIG. 4 is an illustration of a hardware implementation for the methods of FIGS. 1 and 3.

The hardware implementation of the encoder and decoder is not limited to any particular type. For example, the machine illustrated in FIG. 4 may be used for encoding and/or decoding. The machine 410 includes a processor 412 and memory 414 encoded with a program 416. When executed, the program 416 instructs the processor 412 to either access a color image and perform the compression in accordance with an embodiment of the present invention, or read a bitstream and reconstruct a digital image in accordance with an embodiment of the present invention. The processor 412 outputs a signal 418 representing either the bitstream or the reconstructed image. The signal 418 may be stored in the machine 410, transmitted elsewhere or recorded in a storage medium (e.g., an optical disc) 420.

The information for selecting the color caches and estimating the luminance is obtained from causal neighborhoods of the current pixels. In one example describe above, the causal neighborhood consisted of NW, N, NE and W pixels. However, the causal neighborhood is not so limited.

Although the ordering of the pixel values in the color caches was described as "luminance" ordering, the pixel values may be ordered in other ways. For example, the pixel values may be ordered in the order in which they are processed.

Although the compression and reconstruction were described in connection with RGB color space, they are not so limited. Other color spaces may be used. Examples of such color spaces include but are not limited to CMYK color space.

Although the compression and reconstruction were described as being lossless, they are not so limited. For example, compression can be performed with a quantized error (as practiced in the "near-lossless" mode of JPEG-LS) rather than an exact error.

The present invention is not limited to the specific embodiments described and illustrated above. Instead, the present invention is construed according to the claims that follow.

The invention claimed is:

1. Apparatus for processing an image, the apparatus comprising a machine for accessing a plurality of color caches corresponding to different chromatic contexts, selecting a color cache for a pixel value being processed, and using information in the selected color cache to predict a value for the pixel being processed.

2. The apparatus of claim 1, wherein all color components of the pixel being processed are coded simultaneously.

3. The apparatus of claim 1, wherein a color cache is selected according to chromatic context from chromatic values of a causal neighborhood of pixels.

4. The apparatus of claim 3, wherein information in a selected cache is indexed by using a predicted luminance value for the pixel being processed, the predicted luminance value being computed from a causal neighborhood of pixels.

5. The apparatus of claim 3, wherein a color cache is selected by dividing the UV plane into n disjoint regions; wherein an x-dimensional vector is generated, where x is the number of pixels in the causal neighborhood and whereby $n^x$ candidate chromatic contexts are available for selection; and wherein the vector is mapped on a one-to-one basis into an index in the range [0, $n_x$−1], the index identifying the selected color cache.

6. The apparatus of claim 5, wherein the number and the shape of the regions into which the UV-plane is divided is different for each of the x pixels in the causal neighborhood.

7. The apparatus of claim 3, wherein a color cache is selected by dividing the UV plane into n disjoint regions; wherein an x-dimensional vector is generated, where x is the number of pixels in the causal neighborhood and whereby $n^x$ candidate chromatic contexts are available for selection; and wherein the candidate cache with the largest estimated likelihood is selected.

8. The apparatus of claim 3, wherein a color cache is selected by dividing the UV plane into as many regions as color caches; assigning one color cache per region; identifying a color cache for each pixel in the causal neighborhood; and selecting the identified color cache that occurs most often.

9. The apparatus of claim 3, wherein a color cache is selected by dividing the UV plane into as many regions as color caches; assigning one color cache per region; determining whether adjacent pixels have the same regions, whereby an edge is assumed; and selecting the color cache corresponding to the region of a pixel along the edge.

10. The apparatus of claim 1, wherein the machine adds the actual pixel value of the pixel being processed to the selected color cache if the actual pixel value is not already contained within the color cache.

11. The apparatus of claim 1, wherein the machine removes unlikely pixel values from the color caches.

12. The apparatus of claim 1, wherein the machine performs image compression.

13. The apparatus of claim 12, wherein the machine uses a code word to describe an error vector between the predicted value and the actual value of the pixel being processed; and wherein the machine uses a backup coder if the error vector cannot be described by the code word.

14. The apparatus of claim 12, wherein the machine predicts an index to the selected color cache for the pixel being processed, determines an actual index in the selected color cache, and uses a code word to describe the error between the predicted and actual indices; and wherein the machine uses a backup coder if the error cannot be computed or described by the code word.

15. The apparatus of claim 1, wherein the machine performs image reconstruction.

16. Apparatus comprising:
means for accessing a plurality of color caches corresponding to different chromatic contexts;
means for selecting a color cache for a pixel being processed; and
means for using information in the selected color cache to predict a value for the pixel being processed.

17. A digital image encoder comprising a processor for accessing a plurality of color caches corresponding to different chromatic contexts, selecting a color cache for a pixel value being processed, and using information in the selected color cache to predict a value for the pixel being processed.

18. The encoder of claim 17, wherein a color cache is selected according to chromatic context from chromatic values of a causal neighborhood of pixels.

19. The encoder of claim 17, wherein information in the selected cache is indexed by using a predicted luminance value for the pixel being processed, the predicted luminance value being computed from a causal neighborhood of pixels.

20. The encoder of claim 17, wherein the processor adds the actual pixel value of the pixel being processed to the selected color cache if the actual pixel value is not already contained within the color cache.

21. The encoder of claim 17, wherein the processor removes unlikely pixel values from the color caches.

22. The encoder of claim 17, wherein the processor uses a code word to describe an error vector between the predicted value and the actual value of the pixel being processed; and wherein the processor uses a backup coder if the error vector cannot be described by the code word.

23. The encoder of claim 17, wherein the processor predicts an index to the selected color cache for the pixel being processed, determines an actual index in the selected color cache, and uses a code word to describe the error between the predicted and actual indices; and wherein the processor uses a backup coder if the error cannot be computed or described by the code word.

24. A method of processing an image, the method comprising:
accessing a plurality of color caches corresponding to different chromatic contexts;
selecting a color cache for a pixel value being processed; and
using information in the selected color cache to predict a value for the pixel being processed.

25. The method of claim 24, wherein all color components of the pixel being processed are coded simultaneously.

26. The method of claim 24, wherein a color cache is selected according to chromatic context from chromatic values of a causal neighborhood of pixels.

27. The method of claim 26, wherein information in the selected cache is indexed by using a predicted luminance value for the pixel being processed, the predicted luminance value being computed from the causal neighborhood of pixels.

28. The method of claim 24, further comprising adding the actual pixel value of the pixel being processed to the selected color cache if the actual pixel value is not already contained within the color cache.

29. The method of claim 24, further comprising removing unlikely pixel values from the color caches.

30. The method of claim 24, wherein the image is compressed.

31. The method of claim 30, further comprising using a code word to describe an error vector between the predicted value and the actual value of the pixel being processed; and using a backup coder if the error vector cannot be described by the code word.

32. The method of claim 30, further comprising predicting an index to the selected color cache for the pixel being processed; determining an actual index in the selected color cache; and using a code word to describe the error between the predicted and actual indices or using a backup coder if the error cannot be computed or described by the code word.

33. The method of claim 24, wherein image is reconstructed from the predicted pixel values.

34. An article for causing a processor to process a digital image, the article comprising computer memory encoded with a plurality of instructions that, when executed, cause the processor to generate a plurality of color caches corresponding to different chromatic contexts, select a color cache for each pixel value being processed, and use information in the selected color cache to predict a value for the pixel being processed.

35. Apparatus for processing a digital image, the apparatus comprising a processor for generating a cache of pixel values already processed, using the cache to predict a value of a pixel being processed, and adding a pixel value to the cache if the actual value of the pixel being processed is not found in the cache.

36. The apparatus of claim 35, wherein the processor removes a pixel value from the cache if that pixel value is not likely to occur again.

37. Apparatus for processing a digital image, the apparatus comprising:
means for generating a cache of pixel values already processed;
means for using the cache to predict a value of a pixel being processed; and
means for adding a pixel value to the cache if the actual value of the pixel being processed is not found in the cache.

38. The apparatus of claim 37, wherein the means for adding the pixel value also removes the pixel value from the cache if that pixel value is not likely to occur again.

39. A method of processing a digital image, the method comprising:
generating a cache of pixel values already processed;
using the cache to predict a value of a pixel being processed; and
adding a pixel value to the cache if the actual value of the pixel being processed is not found in the cache.

40. The method of claim 39, further comprising removing a pixel value from the cache if that pixel value is not likely to occur again.

* * * * *

UNITED STATES PATENT AND TRADEMARK OFFICE
CERTIFICATE OF CORRECTION

PATENT NO. : 7,136,533 B2  Page 1 of 1
APPLICATION NO. : 10/324582
DATED : November 14, 2006
INVENTOR(S) : Gadiel Seroussi et al.

It is certified that error appears in the above-identified patent and that said Letters Patent is hereby corrected as shown below:

In column 3, line 50, before "otherwise" delete "$L_{NM}$" and insert -- $L_{NW}$ --, therefor.

In column 6, line 53, in Claim 5, after "range" delete "$[0, n_x-1]$" and insert -- $[0, n^x-1]$ --, therefor.

Signed and Sealed this

Thirtieth Day of March, 2010

David J. Kappos
*Director of the United States Patent and Trademark Office*